(12) United States Patent
Dal Santo et al.

(10) Patent No.: US 8,240,615 B2
(45) Date of Patent: Aug. 14, 2012

(54) METHOD AND DEVICE FOR AUTOMATICALLY PROTECTING AN AIRCRAFT AGAINST A HARD LANDING

(75) Inventors: Xavier Dal Santo, Blagnac (FR); Armand Jacob, Pibrac (FR)

(73) Assignees: Airbus Operations SAS, Toulouse (FR); Airbus, Blagnac (FR)

( * ) Notice: Subject to any disclaimer, the term of this patent is extended or adjusted under 35 U.S.C. 154(b) by 1000 days.

(21) Appl. No.: 12/193,467

(22) Filed: Aug. 18, 2008

(65) Prior Publication Data

US 2009/0050746 A1    Feb. 26, 2009

(30) Foreign Application Priority Data

Aug. 20, 2007    (FR) ................................. 07 05907

(51) Int. Cl.
    *G05D 1/00*    (2006.01)
(52) U.S. Cl. ........................................ 244/186; 244/183
(58) Field of Classification Search .................. 244/186, 244/187, 182; 701/3, 5, 7, 8
    See application file for complete search history.

(56) References Cited

U.S. PATENT DOCUMENTS

| | | | | |
|---|---|---|---|---|
| 3,698,669 A * | 10/1972 | Miller | ........................... | 244/186 |
| 4,357,661 A | 11/1982 | Lambregts et al. | | |
| 4,485,446 A * | 11/1984 | Sassi | ................................ | 701/4 |
| 5,224,664 A * | 7/1993 | Adams et al. | .............. | 244/17.13 |
| 5,377,937 A * | 1/1995 | LaMay et al. | ................. | 244/185 |
| 5,826,834 A * | 10/1998 | Potter et al. | .................... | 244/195 |
| 5,957,412 A * | 9/1999 | Saint Upery et al. | ......... | 244/180 |
| 6,492,934 B1 * | 12/2002 | Hwang et al. | ................... | 342/33 |
| 7,693,620 B2 * | 4/2010 | Dubeck et al. | ................. | 701/16 |
| 2007/0016343 A1 | 1/2007 | Hanel | | |

FOREIGN PATENT DOCUMENTS

EP    0 708 393    4/1996

OTHER PUBLICATIONS

Preliminary Search Report dated Mar. 10, 2008 w/ English translation.

* cited by examiner

*Primary Examiner* — Tien Dinh
(74) *Attorney, Agent, or Firm* — Dickinson Wright PLLC

(57) ABSTRACT

Disclosed is a method and device for automatically protecting an aircraft against a hard landing. A measuring unit measures current vertical speed and current relative height of the aircraft. A first command generating unit generates first commands to act on the vertical speed of the aircraft by determining an intermediate command from the measured vertical speed and height and converting the intermediate command into turn angles. A speed calculation unit applies the first commands to control surfaces. The first commands are generated from the measured current vertical speed and height, taking into account a predetermined reference vertical speed, such that the aircraft touches down on the ground at a vertical speed not greater than the predetermined reference vertical speed.

7 Claims, 2 Drawing Sheets

METHOD AND DEVICE FOR AUTOMATICALLY PROTECTING AN AIRCRAFT AGAINST A HARD LANDING

BACKGROUND OF THE INVENTION AND DESCRIPTION OF THE PRIOR ART

The present invention relates to a method and a device for automatically protecting an aircraft, particularly a transport airplane, against a hard landing.

In the context of the present invention, a landing is considered to be a hard landing when, during landing, the impact between the aircraft and the ground occurs at a high vertical speed carrying the risk of endangering those on board the aircraft and/or of leading to damage or breakage of parts or components of the aircraft.

It is known that the final landing maneuvers are the phases in flight that present high risks, due in particular to the proximity to the ground. The critical nature of this situation may be further aggravated by factors such as poor weather conditions or reduced aircraft handling, which make the aircraft difficult to fly and increase the risk of touching down onto the ground at a high vertical speed.

In a hard landing, the aircraft has to undergo a technical inspection and, if necessary, any damaged components have to be replaced in order to ensure the safety of subsequent flights. In a situation such as this the aircraft is therefore immobilized on the ground until the inspection and the technical maintenance have been completed. In the field of commercial aviation, such operations are generally lengthy and costly. In addition, logistic problems (availability of spare parts) may be encountered in addition to the costs associated with the inability of the aircraft to fly immediately (compensation for cancellations and delays).

What is more, the solution whereby certain constituent components might be reinforced in order to make the aircraft more robust in the face of hard landings has the disadvantage of increasing the weight and thus reducing the overall performance of the aircraft.

SUMMARY OF THE INVENTION

It is an object of the present invention to overcome the aforementioned disadvantages. The invention relates to a method for automatically protecting an aircraft, during a landing, from a hard landing.

To this end, according to the invention, said method is notable in that the following series of successive operations is performed automatically and repeatedly:

a) the current vertical speed and the current relative height of the aircraft with respect to the ground are measured;

b) using said measured current vertical speed and said current height of the aircraft, together with speed information that takes account of a predetermined reference vertical speed which is such that there will be no hard landing as the aircraft touches down onto the ground at this reference vertical speed, first commands are generated for controlling control surfaces which act on the vertical speed of the aircraft, said first commands being such that, when applied to said control surfaces, the aircraft touches down onto the ground during landing at said reference vertical speed; and c) said first commands (which represent protection commands), are applied to said control surfaces.

Thus, by virtue of the invention, the vertical speed of the aircraft is, if necessary, controlled in such a way that the aircraft touches down onto the ground (during a landing) at worst at a reference vertical speed for which there will be no hard landing, as specified hereinbelow, thus overcoming the aforementioned disadvantages.

In addition, the protection method according to the invention is implemented automatically. Thus, there is no increase in the workload of the pilot or pilots of the aircraft in order to afford the protection.

Furthermore, in a preferred embodiment, the following operations are also performed, repeatedly:

second commands are generated which are also intended for controlling said control surfaces (which act on the vertical speed of the aircraft);

a first vertical speed which is generated when said first commands are applied to said control surfaces is automatically compared against a second vertical speed which is generated when said second commands are applied to said control surfaces; and on the basis of this comparison:

if said second vertical speed is lower than said first vertical speed then said second commands are automatically applied to said control surfaces in step c); and if said second vertical speed is greater than or equal to said first vertical speed then said first commands are applied automatically to said control surfaces in said step c).

In the context of the present invention, said second commands may be generated in the usual way, either by an autopilot device or by a pilot by actuating a control. Thus, by virtue of said aforementioned preferred embodiment, as long as said second commands, which are generated on the aircraft in the usual way, generate a (second) vertical speed that remains lower than a (first) vertical speed relating to protection against a hard landing, these second commands are applied to the aircraft in the usual way. Protection against a hard landing is according to the invention, the purpose of which is to apply said first commands in place of said second commands, is therefore implemented only when there is a risk of a hard landing. Hence, as long as there is no such risk, the present invention does not influence the control of the vertical speed of the aircraft, which is then achieved in the usual way.

In one particular embodiment, in step b):

an intermediate command is determined using said measured current vertical speed, said measured current height and said speed information; and this intermediate command is converted into turn angles for said control surfaces, which represent said first commands.

In this case, in a first preferred alternative form of embodiment, wherein a vertical acceleration value γz is determined, by way of intermediate command, using the following expression:

$$\gamma z = (Vz^2 - V\text{cons}^2)/(2 \cdot h)$$

in which:

Vz is said measured current vertical speed of the aircraft;

Vcons is said speed information which corresponds to said reference vertical speed; and h is said measured current height.

Furthermore, in a second alternative form of embodiment, a value that is proportional to the difference between the measured current vertical speed and a vertical speed value that corresponds to the vertical speed of a speed profile at said measured current height is determined by way of intermediate command. More specifically, said speed profile corresponds to said speed information and illustrates the variation in a limit value of vertical speed as a function of height relative to the ground, this limit value of vertical speed being equal to said reference vertical speed at zero height.

The present invention also relates to a device for automatically protecting an aircraft against a hard landing.

According to the invention, said device is notable in that it comprises:
- means for automatically measuring at least the current vertical speed and the current height of the aircraft;
- means for automatically generating, using said measured current vertical speed and said measured current height of the aircraft, together with speed information that takes account of a predetermined reference vertical speed which is such that there will be no hard landing if the aircraft touches down onto the ground at this reference vertical speed, first commands intended to control surfaces which act on the vertical speed of the aircraft, said first commands being such that, when they are applied to said control surfaces, the aircraft touches down onto the ground during landing at said reference vertical speed; and
- means for automatically applying said first commands (which represent protection commands) to said control surfaces.

Furthermore, in a preferred embodiment, said device additionally comprises:
- means, for example an autopilot device or a control that the pilot can actuate, for generating second commands which are also intended to control said control surfaces which act on the vertical speed of the aircraft;
- means for automatically comparing a first vertical speed which is generated when said first commands are applied to said control surfaces against a second vertical speed which is generated when said second commands are applied to said control surfaces; and
- means for automatically, on the basis of this comparison, applying to said control surfaces:
  - said second commands if said second vertical speed is lower than said first vertical speed; and
  - said first commands if said second vertical speed is greater than or equal to said first vertical speed.

It will be noted that the automatic protection device according to the invention does not prevent the aircraft from reaching the ground. In addition, it does not interfere with the flying of the aircraft during maneuvers culminating in conventional landings. It interferes only where there is a risk of a hard landing. This automatic protection device therefore replaces the flying of the aircraft when this is too difficult or defective, without in any way thereby modifying the practices adopted by the pilot when maneuvering the aircraft close to the ground. Furthermore, said device according to the invention allows the aircraft to be protected against a hard landing without thereby significantly increasing the mass of this aircraft.

BRIEF DESCRIPTION OF THE DRAWINGS

The figures of the attached drawing will make it easy to understand how the invention may be embodied. In these figures, identical references denote elements that are similar.

DESCRIPTION OF THE PREFERRED EMBODIMENT(S)

Figure 1:
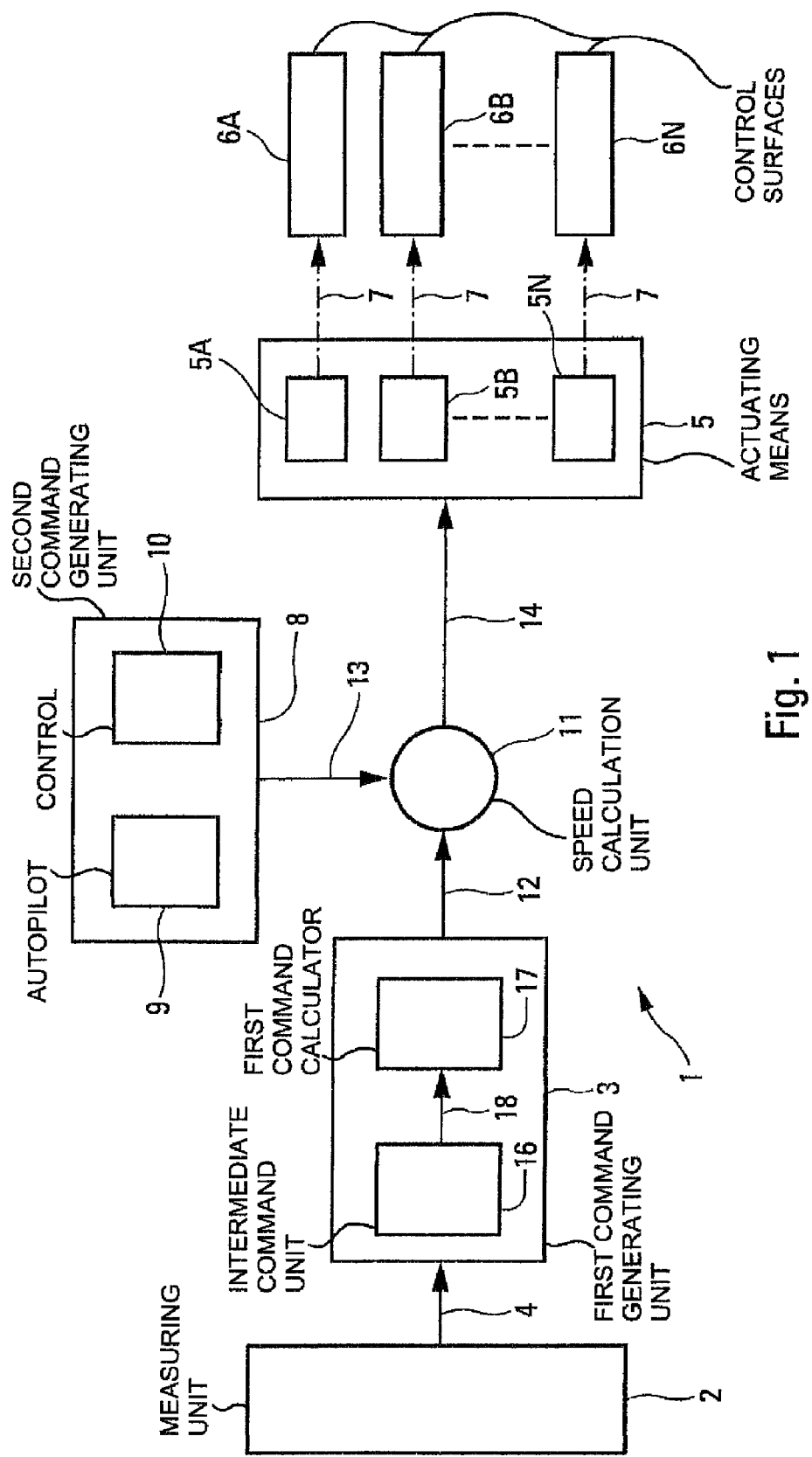
FIG. 1 is the block diagram of a protection device according to the invention.

The device 1 according to the invention and depicted schematically in FIG. 1 is intended to protect an aircraft, particularly a transport airplane, automatically against a hard landing during landing.

In the context of the present invention, a landing is considered to be a hard landing when, during the landing, the impact between the aircraft and the ground takes place at a high vertical speed carrying a risk of endangering those on board and/or of leading to damage or breakage of parts or components of the aircraft.

According to the invention, said device 1 comprises:
- a collection 2 of data sources which comprises customary means (not specifically depicted) for automatically measuring the current vertical speed of the aircraft and customary means (again not specifically depicted) for automatically measuring the current height of the aircraft relative to the ground;
- a calculation unit 3 which is connected by a link 4 to said collection 2 of data sources and which is intended automatically to generate first commands for controlling the vertical speed of the aircraft; and
- a collection 5 of actuating means 5A, 5B, . . . , 5N which are associated respectively with control surfaces 6A, 6B, . . . , 6N of the aircraft, as illustrated via links 7, in chain line, and which are formed in such a way as to apply received (control) commands, particularly said first commands, automatically to said control surfaces 6A to 6N specified hereinbelow which, in the context of the present invention, act on the vertical speed of the aircraft.

According to the invention, said calculation unit 3 is formed in such a way as to generate said first commands using the current vertical speed and the current height of the aircraft, both measured by said collection 2, and speed information (specified hereinafter) which takes account of a predetermined reference vertical speed. This reference vertical speed is such that there will be no hard landing if the aircraft touches down onto the ground at said reference vertical speed. This reference vertical speed is therefore dependent on characteristics of the aircraft (the mass, the type of structure, etc.). In addition, according to the invention, said first commands generated by the calculation unit 3 are such that, when they are applied to said control surfaces 6A to 6N, the aircraft touches down onto the ground, during the landing, at said reference vertical speed.

Thus, the device 1 according to the invention if necessary controls the vertical speed of the aircraft so that this aircraft touches down onto the ground (during a landing) at worst at said reference vertical speed at which there will be no hard landing.

In addition, the protection according to the invention is afforded automatically by said device 1, thus not increasing the workload of the pilot or pilots of the aircraft.

What is more, in a preferred embodiment depicted in FIG. 1, said device 1 additionally comprises:
- means 8 which, for example, comprise a customary autopilot device 9 and/or a customary control 10, such as a joystick for example, which can be actuated by a pilot of the aircraft. These means 8 are formed in such a way as to generate, in the usual way, second commands that can also be used to control said control surfaces 6A to 6N which act on the vertical speed of the aircraft; and means 11 which are connected via links 12 and 13 respectively to said calculation unit 3 and to said means 8 and which are formed in such a way as to:

(if necessary) automatically calculate a first vertical speed which is generated when said first commands (determined by the calculation unit 3) are applied to said control surfaces 6A to 6N and a second vertical speed which is generated when said second commands (determined by the means 8) are applied to said control surfaces 6A to 6N; and compare said first and second vertical speeds against one another.

In addition, said means 11 are formed in such a way as to apply the following commands automatically to said control surfaces 6A to 6N, on the basis of this comparison:

said second commands (corresponding to a customary control) if said second vertical speed is lower than said first vertical speed; and said first commands (that afford protection against a hard landing) if said second vertical speed is greater than or equal to said first vertical speed (that is to say if there is a risk of a hard landing).

To do this, said means 11 use a link 14 to transmit to said collection 5 of actuating means 5A to 5N either said first commands which have been generated by said calculation unit 3, or said second commands which have been generated in the usual way by said means 8, for example by the customary autopilot device 9 or as a result of actuation of the control 10.

It will be noted that the automatic protection device 1 according to the invention does not prevent the aircraft from reaching the ground. In addition, it does not interfere with the flying of the aircraft during maneuvers culminating in conventional landings. It interferes only when there is a risk of a hard landing. This automatic protection device 1 therefore replaces the flying of the aircraft when this becomes too difficult or is defective, without thereby in any way modifying the practices adopted by the pilot when maneuvering the aircraft close to the ground. Furthermore, said device 1 according to the invention is able to protect the aircraft against a hard landing without thereby significantly increasing the mass of this aircraft.

In the context of the present invention:

at least some of said control surfaces 6A to 6N may represent elevators of the aircraft (in this instance an airplane) which are situated at the tail of this airplane. Action on these elevators therefore indirectly controls the vertical speed of the airplane; and at least some of said control surfaces 6A to 6N may represent spoilers which are mounted, in the customary way, on the wings of an airplane. These spoilers have a direct effect on lift, thus providing control over the vertical speed of the aircraft.

In one particular embodiment, said means 3 comprise:

means 16 which are formed in such a way as to determine an intermediate command (or control value) in real time, using the current vertical speed and the current height both measured by the collection 2 and speed information specified hereinbelow; and means 17 which are connected via a link 18 to said means 16 and which are formed in such a way as to convert this intermediate command into turn angles for said control surfaces 6A to 6N. These turn angles represent said first commands and are transmitted to said actuating means 5A to 5N when said first commands generated by the calculation unit 3 are being used to control the vertical speed of the aircraft.

In this case, in a preferred first alternative form of embodiment, said means 16 determine a vertical acceleration γz value, by way of intermediate command, and do so using the following expression:

$$\gamma z = (Vz^2 - V\text{cons}^2)/(2.h)$$

in which:

Vz is said current vertical speed of the aircraft, measured by the collection 2;

Vcons is said speed information that corresponds to said reference vertical speed; and h is said current height of the aircraft, also measured by the collection 2.

To convert this vertical acceleration value γz into turn angles for the control surfaces 6A to 6N, the means 17 may multiple it by a gain which is dependent on characteristics of the aircraft, such as its mass, its speed, its balance and/or its geometric configuration. This intermediate command may also be fed through an automatic stabilization loop which then calculates said first commands which are needed in order to achieve the corresponding target vertical acceleration.

Figure 2:
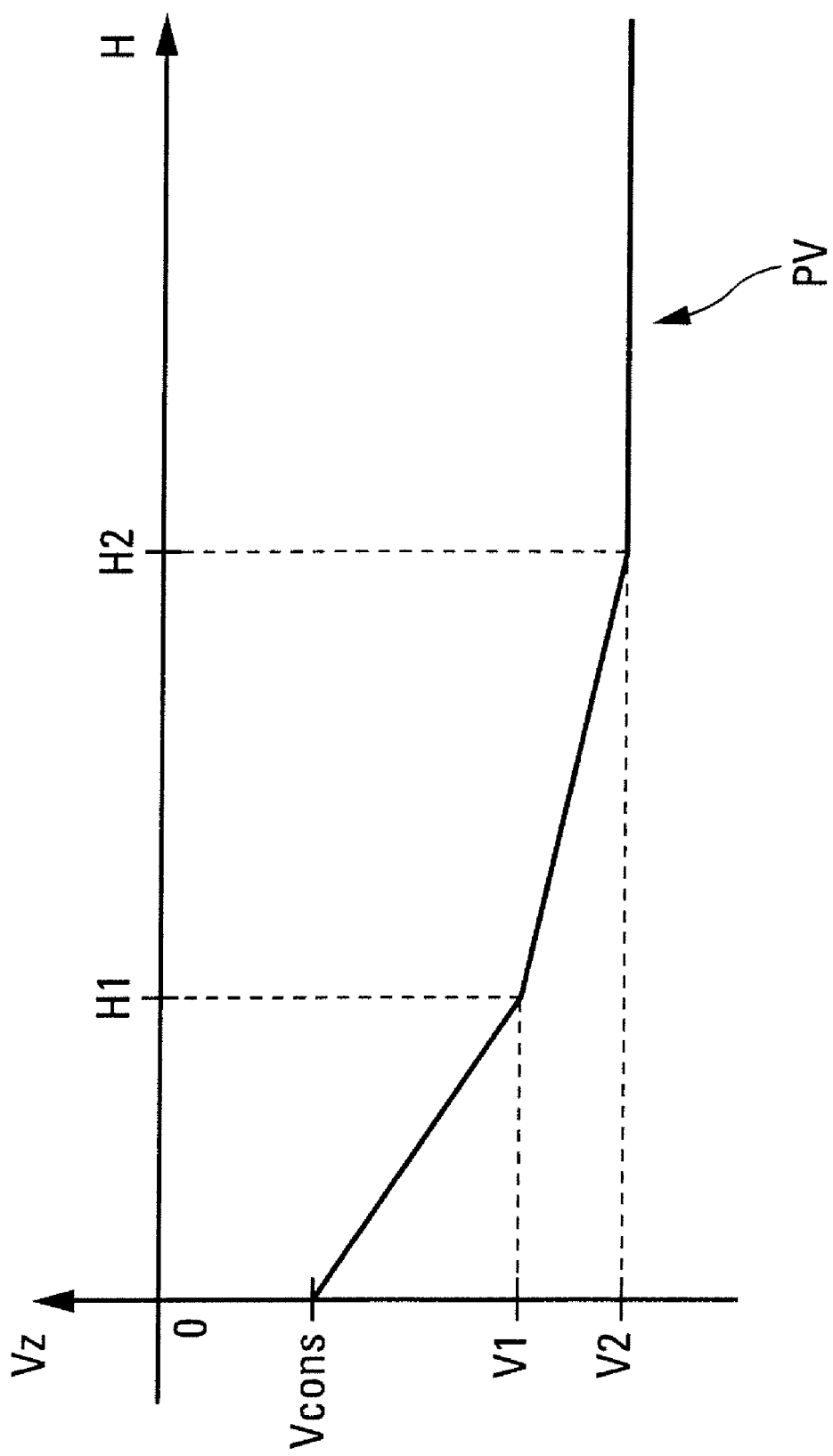
FIG. 2 is a graph illustrating the variation in a vertical speed limiting value as a function of the height relative to the ground, which value is used in one particular embodiment of the invention.

Furthermore, in a second alternative form of embodiment, the means 16, by way of intermediate command, determine a value which is proportional to the difference between the measured current vertical speed and a vertical speed value which corresponds to the vertical speed of a speed profile PV at the measured current height. More specifically, said speed profile PV corresponds to said speed information and illustrates the variation in a limiting value of vertical speed Vz as a function of the height H of the aircraft relative to the ground. This limiting value of vertical speed Vz is equal to said reference vertical speed Vcons at a zero height, as shown in FIG. 2. In addition, it is equal to speeds V1 and V2 at heights H1 and H2 respectively.

Furthermore, in order to ensure that the device 1 according to the invention acts gradually, the closer the aircraft gets to the ground (that is to say as the height H tends towards zero) the value taken into consideration from the speed profile PV becomes increasingly predominant.

The calculation unit 3 may also add stabilization feedback into the aforementioned intermediate value.

The invention claimed is:

1. A method for automatically protecting an aircraft against a hard landing, comprising the steps of:

a) measuring, by a measuring unit, current vertical speed and current relative height of the aircraft with respect to the ground;

b) generating, by a first command generating unit, first commands for controlling control surfaces to act on the vertical speed of the aircraft, wherein the first commands are generated by determining an intermediate command from said measured current vertical speed and said current height, and converting the intermediate command into turn angles for said control surfaces; and c) applying, by a speed calculation unit, said first commands, which represent protection commands, to said control surfaces, wherein said first commands are generated from said measured current vertical speed and said measured current height of the aircraft, and speed information that takes into account a predetermined reference vertical speed in which the aircraft touches down on the ground at a vertical speed not greater than the predetermined reference vertical speed such that there is no hard landing, wherein the intermediate command is determined from a value that is:

a) vertical acceleration value γz, which is determined using the following expression:

$$\gamma z=(Vz^2-V\text{cons}^2)/(2h)$$

in which:
Vz is said measured current vertical speed of the aircraft;
Vcons is said speed information which corresponds to said reference vertical speed; and
h is said measured current height, or
b) a value that is proportional to the difference between the measured current vertical speed and a vertical speed value that corresponds to the vertical speed of a speed profile at said measured current height, and said speed profile corresponds to said speed information and represents a variation in a limit value of vertical speed as a function of height relative to the ground, wherein the limit value of vertical speed is equal to said reference vertical speed at zero height.

2. The method as claimed in claim 1, further comprising:
generating second commands, by a second command generating unit, for controlling said control surfaces to act on the vertical speed of the aircraft; and
comparing, by the speed calculation unit, a first vertical speed generated from said first commands against a second vertical speed generated from said second commands,
wherein:
said second commands are applied to said control surfaces at a condition in which the corn arison determines that said vertical seed is lower than said first vertical speed, and
said first commands are applied to said control surfaces at a condition in which the comparison determines that said second vertical speed is greater than or equal to said first vertical speed.

3. The method as claimed in claim 1, wherein the intermediate command is determined from the vertical acceleration value γz, with the vertical acceleration value being multiplied by a gain based on at least one aircraft characteristic selected from the group consisting of aircraft mass, aircraft speed, aircraft balance and aircraft configuration.

4. The method as claimed in claim 1, wherein said intermediate command is fed through an automatic stabilization look, then the first commands are calculated from the intermediate commands.

5. A device for automatically protecting an aircraft against a hard landing, said device comprising:
measuring unit that measures current vertical speed and current height of the aircraft with respect to the ground;
first command generating unit that generates first commands to control control surfaces to act on the vertical speed of the aircraft, wherein the first commands are generated by determining an intermediate command from said measured current vertical speed and said current height and converting the intermediate command into turn angles for said control surfaces; and
speed calculation unit that applies said first commands, which represent protection commands, to said control surfaces,
wherein
said first command generating unit generates said first commands from said measured current vertical speed and said measured current height of the aircraft, together with speed information, taking into account a predetermined reference vertical speed in which the aircraft touches down on the ground at a vertical speed not greater than the predetermined reference vertical speed such that there is no hard landing, and
the calculating unit determines the intermediate command from a value that is:
a) a vertical acceleration value γz, which is determined using the following expression:

$$\gamma z=(Vz^2-V\text{cons}^2)/(2h)$$

in which:
Vz is said measured current vertical speed of the aircraft;
Vcons is said speed information which corresponds to said reference vertical speed; and
h is said measured current height, or
b) a value that is proportional to the difference between the measured current vertical speed and a vertical speed value that corresponds to the vertical speed of a speed profile at said measured current height, and said speed profile corresponds to said speed information and represents a variation in a limit value of vertical speed as a function of height relative to the ground, wherein the limit value of vertical speed is equal to said reference vertical speed at zero height.

6. The device as claimed in claim 5, further comprising:
second command generating unit that generates second commands to control said control surfaces to act on the vertical speed of the aircraft; and
wherein said speed calculation unit calculates and compares a first vertical speed generated from said first commands against a second vertical speed generated from said second commands; and
said speed calculation unit applies:
a) said second commands to said control surfaces at a condition in which said second vertical speed is lower than said first vertical speed;
b) said first commands to said control surfaces at a condition in which said second vertical speed is greater than or equal to said first vertical speed.

7. An aircraft,
which comprises a device as claimed in claim 5.

* * * * *